United States Patent
Sano et al.

(10) Patent No.: US 8,654,479 B2
(45) Date of Patent: Feb. 18, 2014

(54) THIN-FILM MAGNETIC RECORDING HEAD WITH THIN FILM WHICH CONSTRUCTS SENSOR OR HEATER BENEATH MAIN MAGNETIC POLE

(75) Inventors: Masashi Sano, Tokyo (JP); Hiromichi Umehara, Tokyo (JP); Mutsumi Fujita, Tokyo (JP); Isamu Toba, Tokyo (JP); Tatsuhiro Nojima, Tokyo (JP); Hitoshi Hatate, Tokyo (JP); Hisayoshi Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/535,858

(22) Filed: Jun. 28, 2012

(65) Prior Publication Data

US 2014/0002921 A1    Jan. 2, 2014

(51) Int. Cl.
*G11B 5/127* (2006.01)
(52) U.S. Cl.
USPC ........................................ 360/125.3; 360/128
(58) Field of Classification Search
USPC .............................................. 360/128, 125.3
See application file for complete search history.

(56) References Cited

U.S. PATENT DOCUMENTS

| 7,885,036 | B2 | 2/2011 | Matono et al. | |
| 8,085,491 | B2* | 12/2011 | Antoku et al. | 360/75 |
| 8,201,321 | B2 | 6/2012 | Matono et al. | |
| 8,373,947 | B1* | 2/2013 | Nojima et al. | 360/234.1 |
| 2009/0262460 | A1* | 10/2009 | Hanchi et al. | 360/235.4 |
| 2011/0157736 | A1* | 6/2011 | Contreras et al. | 360/29 |
| 2011/0235208 | A1* | 9/2011 | Yang | 360/75 |

FOREIGN PATENT DOCUMENTS

| JP | 09161233 A | * | 6/1997 |
| JP | A-2007-257815 | | 10/2007 |

* cited by examiner

*Primary Examiner* — Will J Klimowicz
(74) *Attorney, Agent, or Firm* — Posz Law Group, PLC (57) ABSTRACT

A thin film magnetic recording head having a multilayer structure in which plural thin films are laminated and being a perpendicular recording type that applies a magnetic field perpendicularly to a magnetic recording medium and performs recording, includes a main magnetic pole exposed on an air bearing surface facing the magnetic recording medium and guiding a magnetic flux toward the magnetic recording medium, a thin film positioned beneath the main magnetic pole from a perspective of a lamination direction and configuring a sensor or a heater configured to determine a distance from the magnetic recording medium of the thin film magnetic recording head, and a light-absorbing portion positioned between the main magnetic pole and the thin film.

2 Claims, 8 Drawing Sheets

Fig.1

(Prior Art)

THIN-FILM MAGNETIC RECORDING HEAD WITH THIN FILM WHICH CONSTRUCTS SENSOR OR HEATER BENEATH MAIN MAGNETIC POLE

BACKGROUND OF THE INVENTION

1. Field of the Invention

The present invention relates to a thin-film magnetic recording head with a thin film which constructs a sensor or a heater beneath a main magnetic pole.

2. Description of the Related Art

For high density recording performed to the magnetic recording medium such as a hard disk and the like, a perpendicular recording type magnetic recording head that performs recording as perpendicularly applying a magnetic field to a magnetic recording medium has been used. Normally, such magnetic recording head is a thin film magnetic recording head having a multilayer structure in which plural thin films are laminated, and includes a thin film coil for generating a magnetic flux and a main magnetic pole for leading the magnetic flux to the recording medium. The main magnetic pole is formed by a manufacturing method in which a main magnetic pole material is embedded in a trench after the trench is formed by a photoresist. In the manufacturing method, a photoresist is applied onto a substrate on which components of the thin film head such as a reading element are accumulated, an exposure and a developing are performed to a region of the photoresist where the main magnetic pole is to be formed, and a trench for magnetic pole formation is formed. Then, an $Al_2O_3$ layer is formed on the photoresist and an electrode film for plating current supply is formed. After that, a high magnetic moment material (for example, FeCo), which is a material for the main magnetic pole, is plated, the photoresist is removed, and a planarization treatment is performed. As a result, the main magnetic pole is formed.

For the thin film magnetic recording head that performs perpendicular recording with a high density and an accurate writing width, it is very important to have the main magnetic pole with a highly accurate shape and size to the extent possible. In order to form a main magnetic pole with an accurate shape and size by the above-described manufacturing method, it is necessary to highly accurately perform an exposure and developing of a photoresist for forming a trench for magnetic pole formation.

The thin film magnetic recording head is normally used as being integrated in a slider that flies above a magnetic recording medium at a predetermined interval therebetween. In recent years, the distance between the slider and the magnetic recording medium is very small and approximately a few nanometers. When the slider approaches too much and contacts the magnetic recording medium due to an assembly error, a deformation of the magnetic recording medium, an impulse from the outside, and the like, either one or both of the slider and the magnetic recording medium may be damaged. Accordingly, a head disk interface (HDI) sensor that detects a flying height of the slider from the magnetic recording medium is provided in the slider. The HDI sensor is formed with a metal thin film such as NiFe, Ni, and the like. Also, a heater for flying height adjustment is provided in the slider, and the heater is formed with a metal thin film such as Ta, W, NiCr, NiCu, and the like.

Figure 1:
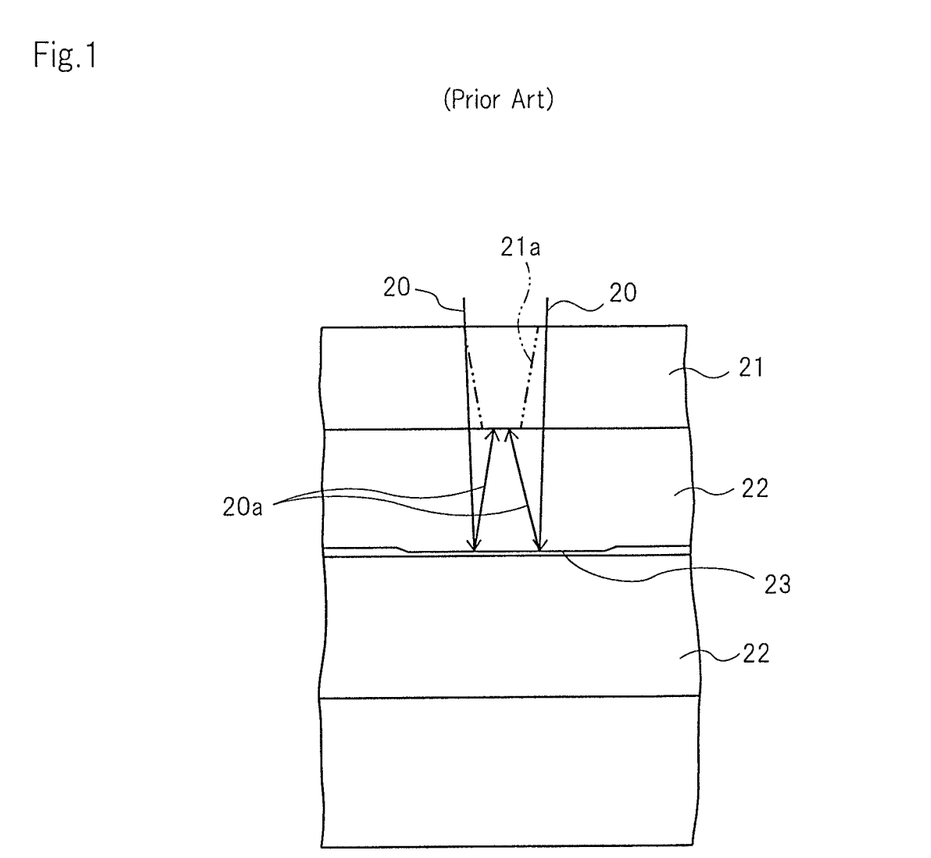
FIG. 1 is a schematic view illustrating an exposure step of a manufacturing method of a conventional thin film magnetic recording head.

In the case that the HDI sensor and/or the heater are/is provided in the slider, for a layout reason, the HDI sensor and/or the heater are/is positioned beneath the main magnetic pole, and the HDI sensor and/or the heater and the main magnetic pole may be overlapped from the perspective of a lamination direction. Hereinafter, a description is given using a case where the HDI sensor is positioned beneath the main magnetic pole as an example. In this case, as illustrated in FIG. 1, in the above-described manufacturing method, exposure light 20 irradiated to a photoresist 21 is transmitted through the photoresist 21 and an insulating layer 22 while exposing the photoresist 21 and reaches an HDI sensor 23. Then, the exposure light 20 is reflected at the HDI sensor 23. Then, reflection light 20a from the HDI sensor 23 is transmitted through the insulating layer 22, enters the photoresist 21 again from its lower side, and exposures the photoresist 21. The reflection light 20a from the HDI sensor 23 is not completely parallel and may be focused or diffused to some degree. When it happens, an exposure region of the photoresist 21 may expand and standing wave may occur, which does not allow the photoresist 21 to be exposed favorably. As a result, a trench for magnetic pole formation 21a (its outline is illustrated by two dot-dash lines) cannot be formed with favorable accuracy in size.

Also, the photoresist 21 is exposed by the exposure light 20 that has reached the photoresist 21 from an upper side (not-illustrated light source side) and the reflection light 20a that has reached the photoresist 21 from a lower side (HDI sensor 23). The reflection light 20a at the HDI sensor 23 disperses within an accumulation substrate in-plane, and the intensity of the reflection light 20a varies depending on a film thickness of an insulating layer ($Al_2O_3$ layer) 22 that is positioned at a lower side and the like. As a result, a variation may occur in the intensity of light which the region of the photoresist 21 where should be exposed receives within the accumulation substrate in-plane. When within the accumulation substrate in-plane a portion having a high light intensity and a portion having a low light intensity coexist, a variation occurs in a shape, especially a width, of the trench for magnetic pole formation 21a, so that a variation occurs in a width of the main magnetic pole embedded by an electrode film and plating. As a result, a variation occurs in a write width, which is important for a write characteristic. The write width is one of very important standards in a product specification.

As described above, when the trench for magnetic pole formation 21a having a favorable shape and size cannot be formed in the photoresist 21 due to the reflection light 20a from the HDI sensor 23, the shape and the size accuracy of the main magnetic pole deteriorate, the variation in the write characteristic increases, and a manufacture yield thereof decreases.

SUMMARY OF THE INVENTION

An object of the present invention is to provide a thin film magnetic recording head that is provided with a main magnetic pole formed with favorable accuracy in size, that can perform perpendicular recording with high accuracy and high density, and that includes a thin film that configures a sensor or a heater beneath the main magnetic pole.

A thin film magnetic recording head has a multilayer structure in which plural thin films are laminated and is a perpendicular recording type that applies a magnetic field perpendicularly to a magnetic recording medium and performs recording. The thin film magnetic recording head includes a main magnetic pole exposed on an air bearing surface facing the magnetic recording medium and guiding a magnetic flux toward the magnetic recording medium, a thin film positioned beneath the main magnetic pole from a perspective of a lamination direction and configuring a sensor or a heater configured to determine a distance from the magnetic recording medium of the thin film magnetic recording head, and a light-absorbing portion positioned between the main magnetic pole and the thin film. The main magnetic pole may be formed by a lithography method.

The light-absorbing portion preferably has a multilayer structure including at least a first light-absorbing layer, a second light-absorbing layer, and a transparent layer positioned between the first light-absorbing layer and the second light-absorbing layer. It is further preferred that the first light-absorbing layer and the second light-absorbing layers are made of conductive materials and that the thin film magnetic recording head further comprises a connection line connecting either one of or both the first light-absorbing layer and the second light-absorbing layer with a ground terminal.

The above description, as well as other objects, features, and advantages of the present specification will be evident by the detailed description that follows below with reference to attached drawings exemplifying the present specification.

DESCRIPTION OF THE PREFERRED EMBODIMENTS

Figure 2:
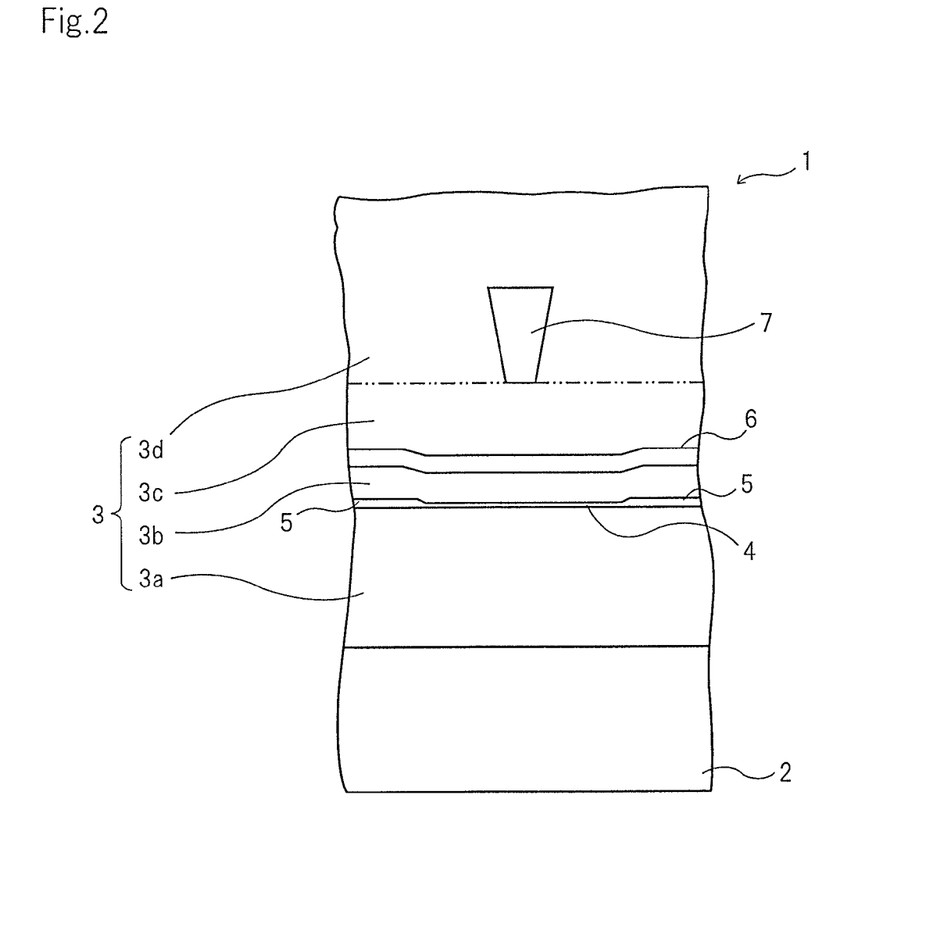
FIG. 2 is a view illustrating an air bearing surface (ABS) of a thin film magnetic recording head according to an embodiment of the present invention.
Figure 3:
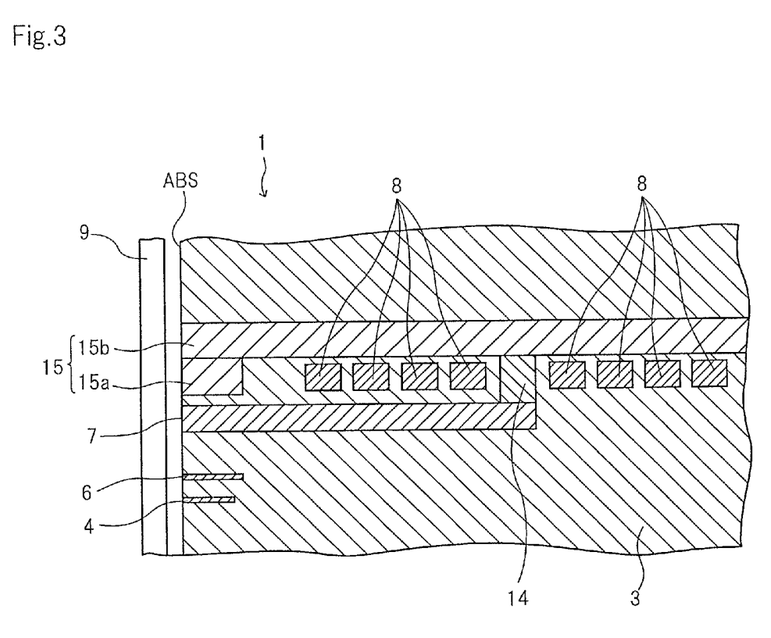
FIG. 3 is a cross-sectional view cut along a direction orthogonal to the ABS of the thin film magnetic recording head illustrated in FIG. 2.

FIG. 2 illustrates an enlarged air bearing surface (ABS) of a thin film magnetic recording head 1 of the present invention. FIG. 3 is a cross-sectional view cut along a direction orthogonal to the ABS of the thin film magnetic recording head 1. The thin film magnetic recording head 1 has a multilayer structure in which plural thin films are laminated. Specifically, an insulating layer 3 made of $Al_2O_3$ or the like is formed on a wafer 2 made of ceramics such as an AlTiC substrate or the like on which components of the thin film magnetic recording head 1 such as a reading element are accumulated. An HDI sensor 4 and a lead 5 are provided in the insulating layer 3. The lead 5 serves to connect the HDI sensor 4 with an electric circuit (not illustrated). Further, a light-absorbing portion 6 having a multilayer structure is provided above the HDI sensor 4 with respect to a lamination direction in the insulating layer 3. A main magnetic pole 7 is formed above the insulating layer 3 with respect to the lamination direction, the insulating layer 3 including the HDI sensor 4, the lead 5, and the light-absorbing portion 6 therein. The main magnetic pole 7 is formed of FeCo or the like, and is exposed on the ABS and extends in a direction substantially orthogonal to the ABS. A thin film coil layer 8 is wound around a core (magnetic core) 14 at a position distant from the ABS. The core 14 is connected with the main magnetic pole 7 and extends in a direction orthogonal to the main magnetic pole 7. The HDI sensor 4 is positioned beneath the main magnetic pole 7. The periphery of the main magnetic pole layer 7 is covered by a gap layer (not illustrated) made of a nonmagnetic body, and further a magnetic shield may be provided around the periphery. FIG. 3 illustrates a magnetic shield (trailing shield) 15 made with magnetic body plating films 15a and 15b positioned above the main magnetic pole 7. The present embodiment adopts the configuration in which the HDI sensor 4 is provided beneath the main magnetic pole 7. However, a heater made of a metallic thin film may be provided at a similar position for flying height adjustment. The HDI sensor 4 and the heater are formed with an inorganic material thin film which reflects off ultraviolet rays, specifically, a metallic thin film, a semiconductor thin film, and the like.

Figure 4:
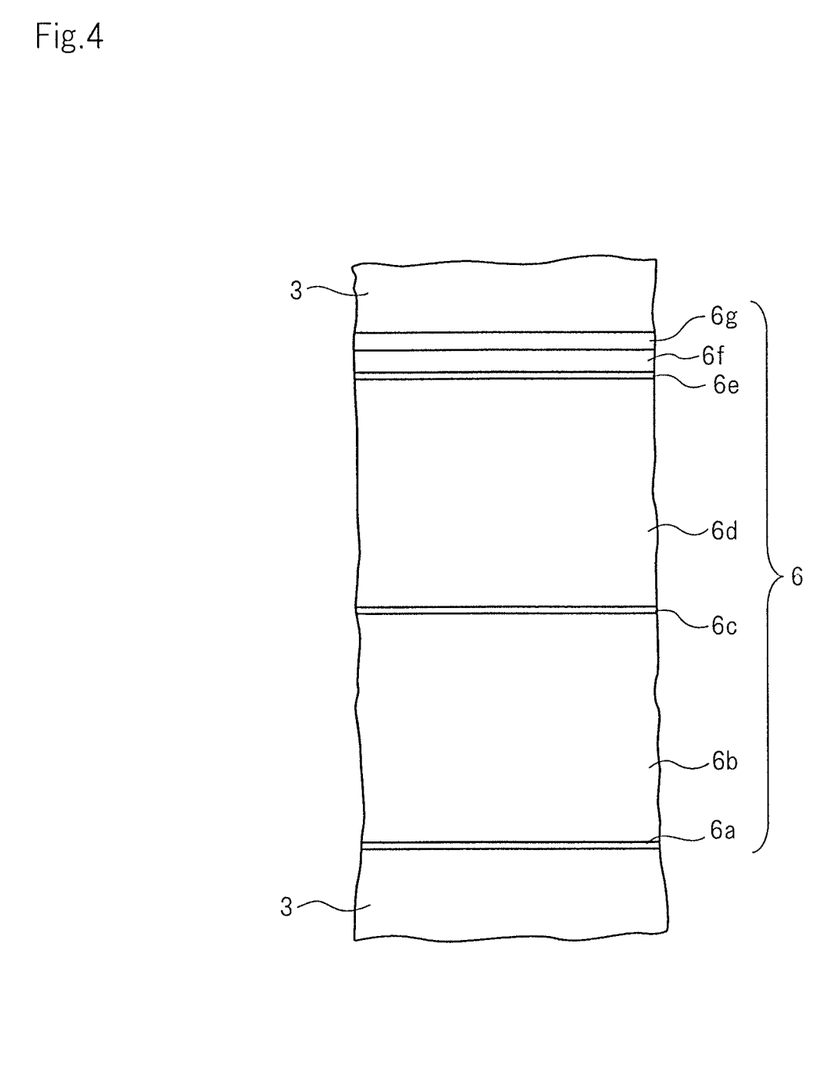
FIG. 4 is an enlarged view of a main part of the thin film magnetic recording head illustrated in FIG. 2.

The light-absorbing portion 6, which is one of main characteristics of the present invention, having a multilayer structure is described in detail with reference to FIG. 4. The light-absorbing portion 6 of the present embodiment has a multilayer structure in which an adhesion layer 6a, a lower light-absorbing layer (first light-absorbing layer) 6b, an adhesion layer 6c, a transparent layer 6d, an adhesion layer 6e, an upper light-absorbing layer (second light-absorbing layer) 6f, and an adhesion layer 6g are laminated from the bottom in this order. Specifically, the adhesion layer 6a is a Cr layer having a thickness of 10 Å; the lower light-absorbing layer 6b is a Ru layer having a thickness of 400 Å; the adhesion layer 6c is a Ti layer having a thickness of 10 Å; the transparent layer 6d is a $SiO_2$ layer having a thickness of 414 Å; the adhesion layer 6e is a Ti layer having a thickness of 10 Å; the upper light-absorbing layer 6f is a Ru layer having a thickness of 35 Å; and the adhesion layer 6g is a Ti layer having a thickness of 101.

The reason why the lower light-absorbing layer 6b and the upper light-absorbing layer 6f—not a single layer of the light absorbing layer—are provided is as follows. When a single layer made of a material having a high extinction coefficient is provided, the intensity of transmission light attenuates. This is expressed by Beer-Lambert law $I(t)=I_0 \exp(-At)$ ($A=4\pi k/\lambda_0$, t=thickness of light-absorbing layer, k=extinction coefficient of light-absorbing layer, I(t)=intensity of light transmitted through light-absorbing layer having thickness t, $I_0$=intensity of light entering light-absorbing layer, $\lambda_0$=wavelength in a vacuum, $\pi$=the circular constant, or pi). According to this, an increase in the film thickness of a light-absorbing layer can exponentially attenuate the intensity of light transmitted through the light-absorbing layer. On the other hand, a reflectance R at an interface between the insulating layer 3 and a single-layer light-absorbing portion is expressed by $\{(n_1-n_2)^2+(k_1-k_2)^2\}/\{(n_1+n_2)^2+(k_1+k_2)^2\}$, (where ($n_i$, $k_i$) is an optical constant of medium i, n=reflectance, and k=extinction coefficient). A certain reflectance exists due to a high extinction coefficient of the light-absorbing portion, and reflection light is generated at an interface between the insulating layer and an upper part of the light-absorbing layer. In other words, when the single-layer light-absorbing layer can suppress the intensity of light transmitted through the single-layer light-absorbing layer, but cannot suppress the reflection light. The reflection light reaches and exposes the photoresist again. In contrast, according to the present embodiment, multiplex reflection occurs between the upper light-absorbing layer 6f and the lower light-absorbing layer 6b, the intensity of the entire reflection light is drastically reduced due to the adjustment of the phase difference of the reflection light, and light transmission to the HDI sensor is eliminated due to the lower light-absorbing layer 6b.

The function of each layer of the light-absorbing portion 6 is described. The lower light-absorbing layer 6b and the upper light-absorbing layer 6f absorb and cut off light such that the light doesn't reach the HDI sensor 4, and is configured at which light multiplex reflects as described above. The transparent layer 6d enables multiplex reflection of light between the lower light-absorbing layer 6d and the upper light-absorbing layer 6f. The adhesion layer 6a enhances adherence between the insulating layer 3 positioned in the lower side and the lower light-absorbing layer 6b. The adhesion layer 6c enhances adherence between the lower light-absorbing layer 6b and the transparent layer 6d. The adhesion layer 6e enhances adherence between the transparent layer 6d and the upper light-absorbing layer 6f. The adhesion layer 6g enhances adherence between the upper light-absorbing layer 6f and the insulating layer 3 positioned in the upper side. Each of the adhesion layers 6a, 6c, 6e, and 6g suppresses a risk of a separation with respect to layers respectively positioned above and below the corresponding adhesion layer. Also, the adhesion layers 6c, 6e, and 6g have the function of reflecting and absorbing light. Therefore, it can be thought that the layers 6a-6c configures the lower light-absorbing layer of a multilayer structure and the layers 6e-6g configure the upper light-absorbing layer having a multilayer structure.

In the above-described thin film magnetic recording head 1, a magnetic flux is induced to the main magnetic pole 7 by the thin film coil layer 8. This magnetic flux is introduced inside the main magnetic pole 7 and is emitted toward the magnetic disk 9, which is the magnetic recording medium, from the ABS. As described above, perpendicular magnetic recording to the magnetic disk 9 is performed. Also, when the HDI sensor 4 detects a temperature change, electric signals are transmitted to a not-illustrated electric circuit via the lead 5. The electric circuit determines a flying height of the slider including the thin film magnetic recording head 1 above the magnetic disk 9 based on the temperature change detected by the HDI sensor 4. When the flying height is excessively small, a control is performed to make the slider be distant from the magnetic disk. An adjustment of the flying height of the slider above the magnetic disk 9 is performed by driving the heater. Even in a case where such heater instead of the HDI sensor 4 is provided beneath the main magnetic pole 7, the above-described effect is obtained by providing the light-absorbing part 6.

Next, a description is given of one example of a manufacturing method of the thin film magnetic recording head 1.

As illustrated in FIG. 2, the insulating layer 3a formed with a $Al_2O_3$ layer is formed on the wafer 2 made of ceramics such as an AlTiC substrate or the like, which eventually becomes a substrate for forming the thin film magnetic recording head 1. Strictly speaking, the insulating layer 3 is formed by several separated steps, so the insulating layer 3a that is a lower side portion of the insulating layer 3 is initially formed herein. Next, the HDI sensor 4 and the lead 5 that is connected to the HDI sensor 4 are formed. The HDI sensor 4 may have a conventionally-known configuration used for a detection of a flying height of the slider, so a detail description thereof is omitted. The lead 5 is made of gold or the like, and connects the HDI sensor 4 with the electric circuit (not illustrated). After the HDI sensor 4 and the lead 5 are formed, an insulating layer 3b formed of a $Al_2O_3$ layer is formed.

According to the present embodiment, the light-absorbing portion 6 is formed on the insulating layer 3b. Specifically, as illustrated in FIG. 4, a Cr layer forming the adhesion layer 6a, a Ru layer forming the lower light-absorbing layer 6b, a Ti layer forming the adhesion layer 6c, a $SiO_2$ layer forming the transparent layer 6d, a Ti layer forming the adhesion layer 6e, a Ru layer forming the upper light-absorbing layer 6f, and a Ti layer forming the adhesion layer 6g are laminated in this order, and thereby the light-absorbing portion 6 having a multilayer structure is formed. One example of thicknesses of the layers is as described above. Then, after the light-absorbing portion 6 is formed, an insulating layer 3c formed of a $Al_2O_3$ layer is formed. Most portion of the insulating layer 3c may be trimmed and removed by an ion-milling or the like in a subsequent process.

Figure 5:
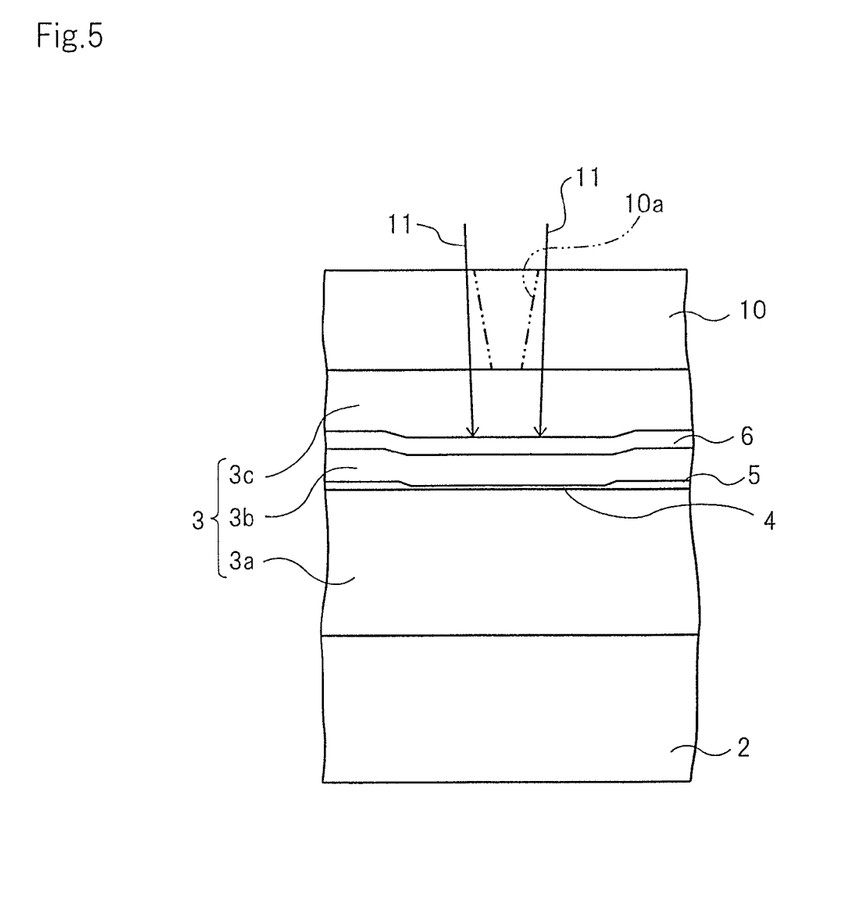
FIG. 5 is a schematic view illustrating an exposure step of a manufacturing method of the thin film magnetic recording head illustrated in FIG. 2.

Next, the main magnetic pole 7 is formed. Specifically, as illustrated in FIG. 5, a photoresist 10 is applied onto the insulating layer 3c. Then, exposure light 11, which is schematically illustrated in FIG. 5, is irradiated to a region of the photoresist 10 where the main magnetic pole 7 is to be formed, and the region is exposed. The detail of the exposure process is described later. Next, a developing is performed, and the exposed portion of the photoresist 10 is removed. As described above, a trench for magnetic pole formation 10a, which is illustrated by the two dot-dash lines in FIG. 5, is formed in the photoresist 10. According to the present embodiment, the trench for magnetic pole formation 10a is positioned above the HDI sensor 4.

Then, in a region including the inside of the trench for magnetic pole formation 10a, a layer made of a high magnetic moment material (For example, FeCo), which is a material of the main magnetic pole, is formed. Then, the photoresist 10 is completely removed using a solvent or the like. At this time, a portion of the layer of the high magnetic moment material that is positioned outside of the trench for magnetic pole formation 10a and on the photoresist 10 is removed by an ion-milling or the like before the removal of the photoresist 10. As described above, the main magnetic pole 7 (see FIG. 2) is formed with the high magnetic moment material remained only inside the trench for magnetic pole formation 10a. Note, after the insulating layer (not illustrated) made of a $Al_2O_3$ layer is formed on the photoresist 10, the layer of the high magnetic moment material, which is positioned further above the insulating layer, may be formed on an insulating layer. In that case, after the photoresist 10 is removed, the portion of the insulating layer that is positioned outside the trench for magnetic pole formation 10a and on the photoresist 10 is also removed at the time. An insulating layer may exist under the main magnetic pole 7 that is inside the trench for magnetic pole formation 10a. The insulating layer is integrated with the insulating layer 3c under the photoresist 10.

After that, an insulating layer 3d made of a $Al_2O_3$ layer is formed on sides of and above the main magnetic pole 7. Also, on the main magnetic pole 7, the thin film coil layer 8 (see FIG. 3), the coil insulating layer, the core 14, the magnetic body plating film 15a, and the magnetic body plating film 15b are formed. And further thereon, an insulating layer made of a $Al_2O_3$ layer is formed. The magnetic body plating film 15a simultaneously formed with the core 14 and the magnetic body plating film 15b formed thereafter are integrated, and the magnetic shield 15 is configured.

For arranging the magnetic shield on sides of and under the main magnetic pole 7, after the main magnetic pole 7 is formed, a portion of the insulating layer whose size corresponds to the size of the magnetic shield to be formed is removed, and after the insulating layer 3d made of the Al$_2$O$_3$ layer is formed according to its necessity, the magnetic shield is formed by a magnetic body plating.

As described above, the thin film magnetic recording head 1 is completed. The thin film magnetic recording head 1 in the complete state includes the insulating layer 3 in which the insulating layers 3a-3d, which are formed by several separated steps, are substantially integrated. A description is omitted regarding a formation of a reproducing element for reading records from the magnetic disk 9.

A detail description is given of an exposure process according to the present embodiment. As described above, the exposure light 11 is irradiated to the region of the photoresist 10 applied on the insulating layer 3c, where the main magnetic pole 7 is to be formed. At that time, the irradiated exposure light 11 is transmitted while exposing the photoresist 10. Then, the exposure light 11 is transmitted through the insulating layer 3c, and most portion of the exposure light 11 is absorbed by the light-absorbing portion 6. Specifically, the exposure light 11 is partially absorbed by the upper light-absorbing layer 6f of the light-absorbing portion 6, is partially absorbed by the lower light-absorbing layer 6b after the exposure light 11 is transmitted through the upper light-absorbing layer 6f and the transparent layer 6d, and is partially multiple-reflected in the transparent layer 6d between the upper light-absorbing layer 6f and the lower light-absorbing layer 6b and canceled by a phase difference. Note, the exposure light 11 may be significantly partially (1% or less) transmitted through the upper light-absorbing layer 6f, the transparent layer 6d, the lower light-absorbing layer 6b, and the insulating layer 3b, and may reach the HDI sensor 4, and may reflect at the HDI sensor 4. The reflection light is partially transmitted through the insulating layer 3b and is absorbed by the lower light-absorbing layer 6b. The transmitted reflection light not absorbed by the lower light-absorbing layer 6b may return to the photoresist 10 after transmitting from the lower light-absorbing layer 6b through the upper light-absorbing layer 6f. The reflection light that contributes to the exposure of the photoresist 10 is approximately 1/10000 of light irradiated from the light source, which is significantly little. As described above, it is possible to suppress the exposure light 11 radiated from the light source (not illustrated) reentering the photoresist 10 from the lower side, after being transmitted from the upper side through the photoresist 10. Therefore, highly accurate exposure can be performed to a desired region of the photoresist 10. As a result, in a subsequent process, the trench for magnetic pole formation 10a having a desired size and shape can be formed with high accuracy by a developing. Further, by forming the layer made of the high magnetic moment material and removing the photoresist 10, the symmetric main magnetic pole 7 having a desired size and shape can be formed with high accuracy. With the thin film magnetic recording head 1, perpendicular recording with high density and an accurate write width can be performed.

Figure 6A:
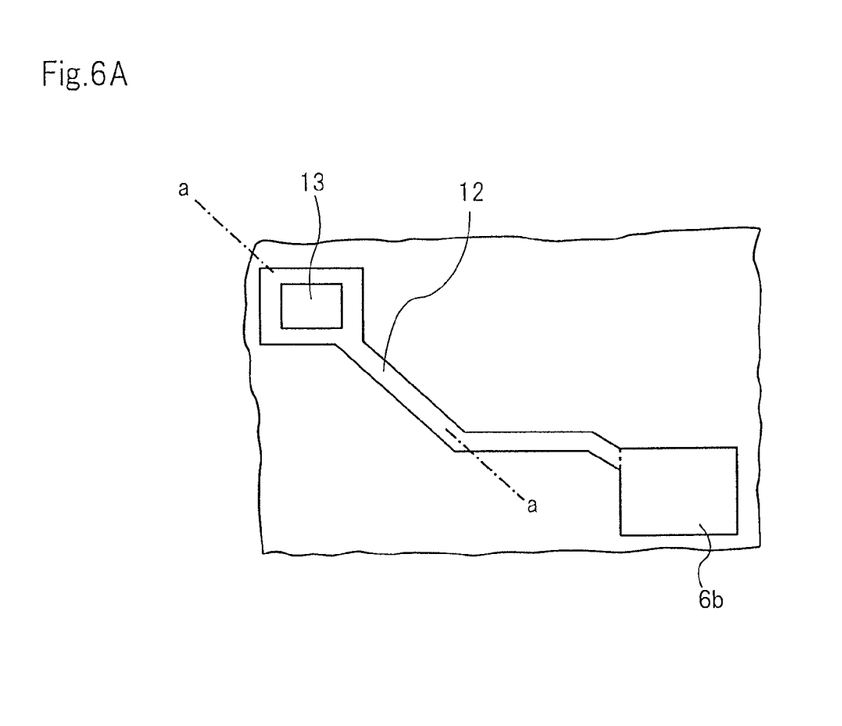
FIGS. 6A and 6B are plan cross-sectional views of the main part of the thin film magnetic recording head illustrated in FIG. 2.
Figure 6B:
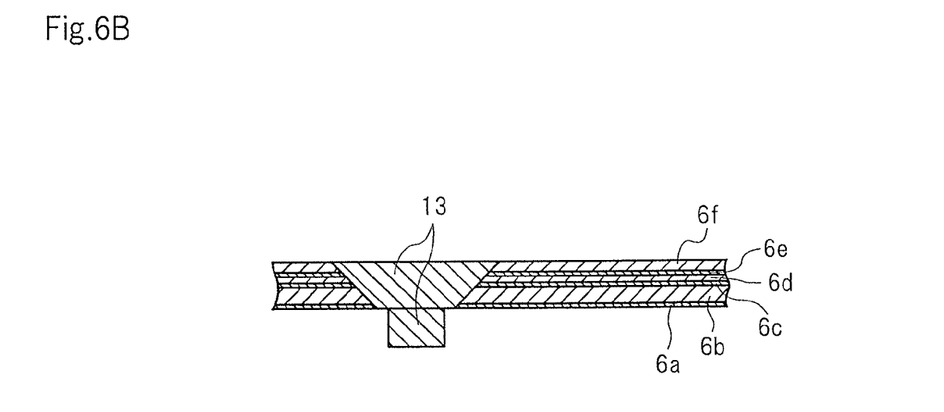

FIG. 6A is a plan cross-sectional view of the main part of the thin film magnetic recording head 1 according to the present embodiment cut along a plane crossing the lower light-absorbing layer 6b. FIG. 6B is an enlarged cross-sectional view cut along an a-a line of FIG. 6A. According to the present embodiment, the lower light-absorbing layer 6b and the upper light-absorbing layer 6f are guided to a ground terminal 13 by a connecting line 12 and are connected to the ground terminal 13. The light-absorbing portion 6 including the lower light-absorbing layer 6b has a rectangular plane shape. Conventionally, the ground terminal 13 is provided for the purpose of preventing an electric short-circuit of the thin film magnetic recording head 1.

A description is given of the technical significance of connection of the lower light-absorbing layer 6b and the upper light-absorbing layer 6f with the ground terminal 13 according to the present embodiment. According to the present embodiment, as illustrated in FIG. 4, the lower light-absorbing layer 6b and the upper light-absorbing layer 6f that are metal layers face each other through the transparent layer 6d that is an insulating layer, or the like interposed therebetween. This is, from the optical perspective, a configuration in which the two light-absorbing layers face each other through the transparent layer interposed therebetween, and from the electric perspective, a condenser structure in which the two conductive layers face each other through the insulating layer interposed therebetween. There is a risk that the usage of the thin film magnetic recording head 1 causes electrical charges to be stored in the condenser structure and a large amount of the electrical charges stored in the condenser structure causes a discharge toward an approaching magnetic disk. This is a phenomena like a thunderbolt to the magnetic disk 9, so the possibility of losing recorded information is significantly high due to the occurrence of damages by the electrostatic discharge of the magnetic disk 9. Then, according to the present embodiment, electric charges are released to the ground terminal 13 so that electric charges are not excessively stored in the lower light-absorbing layer 6b and the upper light-absorbing layer 6f, which are conductive layers, and by doing so, the discharge (thunderbolt) to the magnetic disk 9 is prevented.

As described above, according to the present embodiment, providing the light-absorbing portion 6 having the multilayer structure not only simply absorbs the exposure light 11 but also cancels light having opposite phases due to the multiple reflection between the lower light-absorbing layer 6b and the upper light-absorbing layer 6f. By using those, reflection light can be significantly reduced, and thereby the trench for the magnetic pole formation 10a with extremely highly accuracy can be formed in the photoresist 10. Then, in order that the condenser structure, which is formed by providing the light-absorbing portion 6 having the multilayer structure as described above, does not cause the discharge to the magnetic disk 9, the upper light-absorbing layer 6f and the lower light-absorbing layer 6b are respectively connected to the ground terminal 13. Therefore, the photoresist 10 is exposed with an excellent accuracy, and the trench for magnetic pole formation 10a and the main magnetic pole 7 with preferred sizes and shapes are formed, and this allows perpendicular recording with high density and high accuracy. Thereupon, even after a long-term usage, discharge that may damage the magnetic disk 9 and magnetic information doesn't occur, and thereby the thin film magnetic recording head 1 can be stably used with high reliability for a long term.

As one example, for a case of forming the trench for magnetic pole formation having a width of 180 nm (its tolerance is ±10 nm), the following table shows the width of the trench for magnetic pole formation in a configuration in which the light-absorbing portion 6 is not provided and the width of the trench for magnetic pole formation in the configuration (present embodiment) in which the light-absorbing portion 6 is provided.

|  | Width of Trench for Magnetic Pole Formation (nm) | Standard Deviation of Width of Trench (nm) |
|---|---|---|
| Without Light-Absorbing Portion | 185.8 | 13.2 |
| With Light-Absorbing Portion | 171.6 | 8.0 |

As recognized from the table, according to the present embodiment, the variation in the width of the formed trench for magnetic pole formation is small. In other words, according to the present embodiment, the probability that a preferred main magnetic pole with small size errors is made is extremely high.

Next, a description of a further specific example of the thin film magnetic head is given. Hereinafter, the description is given using a case in which KrF excimer laser (wavelength of 248 nm) is used as the exposure light as an example.

As described above, the light-absorbing portion 6 has the effect of suppressing the influence of light entering the photoresist 10 from its lower layer at the time of the exposure of the photoresist 10 as illustrated in FIG. 5. Then, examined were preferable sizes of layers (see FIG. 4) of the light-absorbing portion 6 suitable for reducing the light entering the photoresist 10 from a layer thereunder.

Of the light-absorbing portion 6, the adhesion layer (Cr layer) 6a and the lower light-absorbing layer (Ru layer) 6b, which are positioned in a lower layer, are intended not to transmit the light to the lower side of the light-absorbing portion 6. The lower light-absorbing layer 6b is preferably a Ru layer which has a high extinction coefficient so that the exposure light can be efficiently attenuated and which can have a relatively thin film thickness, and the thickness is preferably 300 Å or more. According to the above-described embodiment, the thickness of the lower light-absorbing layer 6b is 400 Å.

The adhesion layer (Ti layer) 6c, the transparent layer (SiO$_2$ layer) 6d, the adhesion layer (Ti layer) 6e, the upper light-absorbing layer (Ru layer) 6f, and the adhesion layer (Ti layer) 6g, which are positioned in an upper layer, are intended to extinct reflection light by causing light to multiple-reflect and interfere to each other in the transparent layer 6d. For considering the multiple reflection, the thicknesses of the transparent layer 6d and the upper light-absorbing layer 6f are important. So, a trial calculation was made for the reflectance, varying the thicknesses of the transparent layer (SiO$_2$ layer) 6d and the upper light-absorbing layer (Ru layer) 6f. Specifically, for a case in which KrF excimer laser (wavelength of 248 nm) is irradiated under a state where the insulating layer 3c and the photoresist 10 are formed above the light-absorbing portion 6 as illustrated in FIG. 5, a trial calculation for the reflectance R between the photoresist 10 and the lamination structure of the insulating layer 3c and therebelow was performed. The reflectance R is obtained using a calculation based on transfer-matrix method described below. It is common that the evaluation of the reflectance is performed under a condition where a medium is the atmosphere, but an attention is required for that the medium in the present example is the photoresist 10.

The calculation method is given as follows. Initially, the following calculation is performed.

$$\begin{pmatrix} B \\ C \end{pmatrix} = \left[ \prod_{j=1}^{n} M_j \right] \begin{pmatrix} 1 \\ N_s \end{pmatrix}$$

B: Normalized amplitude of electric field in lamination structure

C: Normalized amplitude of magnetic field in lamination structure $N_s$: Complex index of refraction of substrate ($=n_s-ik_s$)

$n_s$: Refractive index of substrate $k_s$: Extinction coefficient of substrate i: imaginary unit $M_j$: Transfer matrix of j-th layer in lamination structure (Example: $M_1$: Transfer matrix of insulating layer 3c, $M_2$: Transfer matrix of adhesion layer 6g of light-absorbing portion, $M_3$: Transfer matrix of upper light-absorbing layer 6f of light-absorbing portion, $M_n$: Transfer matrix of lamination film (insulating layer 3a) right above substrate (wafer 2))

$$\prod_{j=1}^{n} M_j :$$

Product of a sequence of transfer matrixes ($=M_1 \cdot M_2 \ldots M_n$)

Note, in a case where one layer of the lamination structure absorbs almost all of the exposure light and the influence of the reflection light to the layers below the one layer is small, the calculation may be simplified. Specifically, in a case where the result of calculating a transmission light intensity ratio $I(t)/I_0$ of the one layer using the above-described Beer-Lambert law is 1% or less, a calculation is done regarding a multiple and accumulation of the transfer matrix as the result of layers just above the one layer, and also a calculation may be done regarding the one layer as a substrate upon a calculation.

The transfer matrix of j-th layer is expressed as the following.

$$M_j = \begin{pmatrix} \cos\delta_j & (i\sin\delta_j)/\eta_j \\ i\eta_j \sin\delta_j & \cos\delta_j \end{pmatrix}$$

$\eta_j = n_j - ik_j$, $\delta_j = 2\pi\eta_j d_j \cos\theta_j/\lambda$ $\lambda$: Wavelength of exposure light (nm)

$\pi$: Circular constant (ratio of a circle's circumference to its diameter)

$\eta_j$: Complex index of refraction of j-th layer ($n_j = n_j - ik_j$)

$n_j$: Refractive index of j-th layer $k_j$: Extinction coefficient of j-th layer $d_j$: Thickness of j-th layer (nm)

$\theta_j$: Incident angle of exposure light entering (j+1)-th layer from j-th layer) (°)

$n_o$: Refractive index of optical medium (photoresist)

The reflectance R between the photoresist 10 and a lamination structure of the insulating layer 3c and therebelow can be obtained by the following expression.

$$R = \left(\left|\frac{n_0 - \frac{C}{B}}{n_0 + \frac{C}{B}}\right|\right)^2$$

Note, the above-described refractive index and extinction coefficient are values with respect to exposure light (wavelength nm) to be used.

Referring the trial calculation results, the thicknesses of the transparent layer 6d and the upper light-absorbing layer 6f can be determined such that the reflectance is 5% or less, preferably 3% or less, considering errors due to the calculation. A reflectance in a normal exposure process at the time of the filing of the present application is 5% or more. Therefore, in order to obtain the equivalent or more effect of the reflection light reduction as compared to the conventional art, it is preferred to determine the thicknesses of the transparent layer 6d and the upper light-absorbing layer 6f such that the reflectance is 5% or less.

Figure 7:
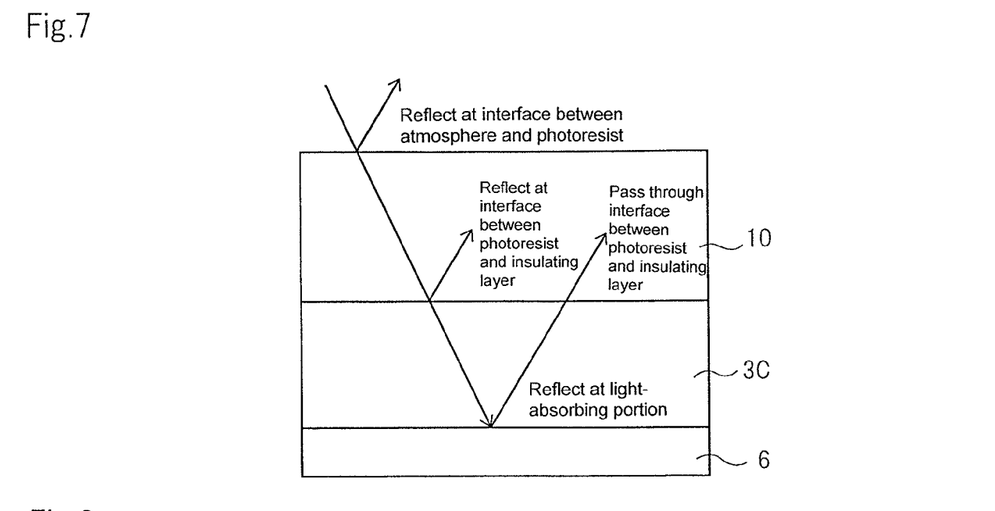
FIG. 7 is a schematic view illustrating a path for exposure light at the time of an exposure of a photoresist for manufacture of the thin film magnetic recording head illustrated in FIG. 2.

Hereinafter, a description is given of a method for experimentally obtaining the reflectance in the exposure process. Initially, a description is given of a situation of reflection light generating during the exposure of the photoresist 10 for forming the main magnetic pole 7. FIG. 7 is a view schematically illustrating reflection light in the exposure process of the photoresist 10 for forming the main magnetic pole 7 of the present invention. As illustrated in FIG. 7, exposure light entering the photoresist 10 from its upper side partially reflects at an interface between the atmosphere and the photoresist 10, the light transmitted through the photoresist 10 partially reflects at an interface between the photoresist 10 and the insulating layer 3c, and the light transmitted through the insulating layer 3c partially enters the insulating layer 3c again from its lower side due to the reflection at the light-absorbing portion 6 and the like. The light entering the insulating layer 3c again from its lower side includes not only reflection light reflecting at the interface between the insulating layer 3c and the light-absorbing portion 6 but also light transmitted again through the light-absorbing portion 6 from its lower side after being reflected at a lower layer (for example, a metal thin film such as HDI sensor 4 or the heater) after being transmitted through the light-absorbing portion 6.

FIG. 7 illustrates a conceptual view of an actual exposure process. A reflectance during an actual exposure, which is the issue here, is the reflectance between the photoresist and the lamination structure of the insulating layer and therebelow. Normally, the optical medium is usually the atmosphere, but it should be noted that the medium is the photoresist according to the present embodiment. The reflection light during the actual exposure can be briefly categorized into reflection light reflecting at the interface between the photoresist 10, which is the medium, and the insulating layer 3c, and reflection light reflecting at the interface between the insulating layer 3c and the light-absorbing portion 6, which is light transmitted through the insulating layer 3c and passing through the interface between the photoresist 10 and the insulating layer 3c. The reflection at the interface between the photoresist 10 and the insulating layer 3c is constant not depending on the lamination structure of the insulating layer 3c and therebelow. The reflectance of the photoresist 10 used in the current invention with respect to KrF excimer laser (wavelength 248 nm) is 1.6-1.9, and is almost the same as the reflectance of $Al_2O_3$ configuring the insulating layer 3c, which is 1.6-1.8. The extinction coefficients of them are 0.1 or less. Therefore, the reflectance is 1% or less, and thereby the contribution to entire reflection light is small.

Figure 8:
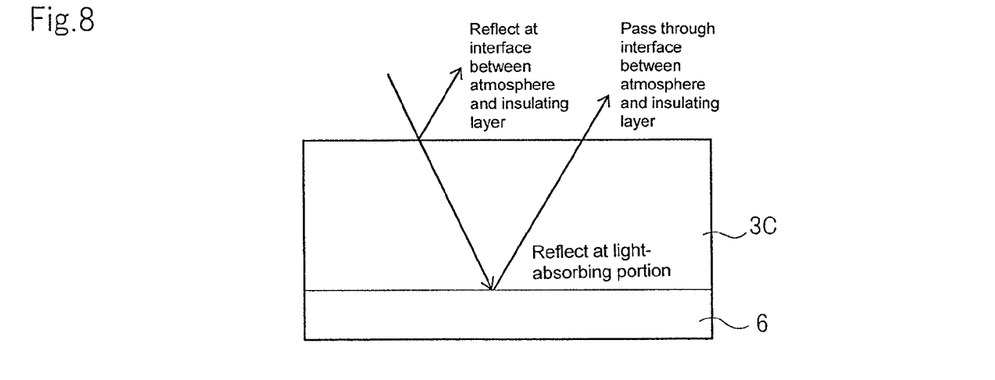
FIG. 8 is a schematic view illustrating a configuration of a sample for evaluating reflection light between an insulating layer and a light-absorbing portion.

On the other hand, regarding the reflectance between the insulating layer 3c and the light-absorbing portion 6, the intensity and phase of the reflection light changes depending on the thickness of the insulating layer 3c, which considerably affects the actual exposure process. In order to stably decrease the reflectance during the actual exposure, it need only decrease the reflectance between the insulating layer 3c and the light-absorbing portion 6, and this is realized by examining the reflection light between the insulating layer 3c and the light-absorbing portion 6 in a state where the photoresist 10 is eliminated. FIG. 8 is a cross-sectional view for a sample used for an examination of the reflectance between the insulating layer 3c and the light-absorbing portion 6 based on the above-described thought. Using the sample with the above-described configuration, it is possible to evaluate the reflection light between the insulating layer 3c and the light-absorbing portion 6 even for a measurement of the reflectance in a normally-performed case where the medium is atmosphere. In FIG. 8, reflection light emitted to the atmosphere, which is the medium for the normal reflectance measurement, is formed with reflectance light at the interface between the atmosphere and the insulating layer 3c and reflection light at a layer (for example, the light-absorbing portion 6) under the insulating layer 3c, which is light transmitted through the insulating layer 3c and passing through the interface between the atmosphere and the insulating layer 3c. Herein, in a case where no reflection occurs at the layer under the insulating layer 3c, the light emitted to the atmosphere from the insulating layer 3c is formed with only the reflection light at the interface between the atmosphere and the insulating layer 3c. Therefore, the reflectance in this measurement is constant without varying depending on the thickness of the insulating layer 3c, in other words, the extent of variation of the reflectance is zero. On the other hand, in a case where reflection occurs at the layer under the insulating layer 3c, as described above, the light emitted to the atmosphere from the insulating layer 3c is the sum of the reflection light at the interface between the atmosphere and the insulating layer 3c and the light reflecting at the layer under the insulating layer 3c and transmitted through the insulating layer 3c. Therefore, the reflectance varies depending on phase difference due to the thickness of the insulating layer 3c. When such light-absorbing portion 6 is provided, reflection light is created in the exposure process.

Figure 9:
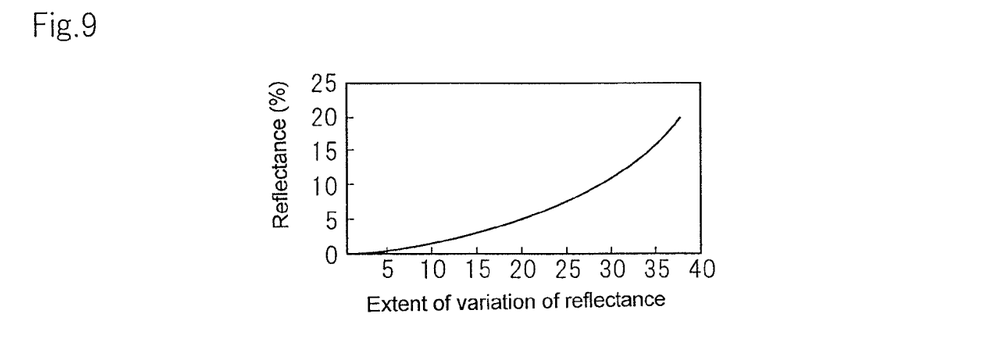
FIG. 9 is a graph illustrating the relationship between the extent of variation of reflectance and the reflectance with respect to the thickness of the insulating layer.
Figure 10:
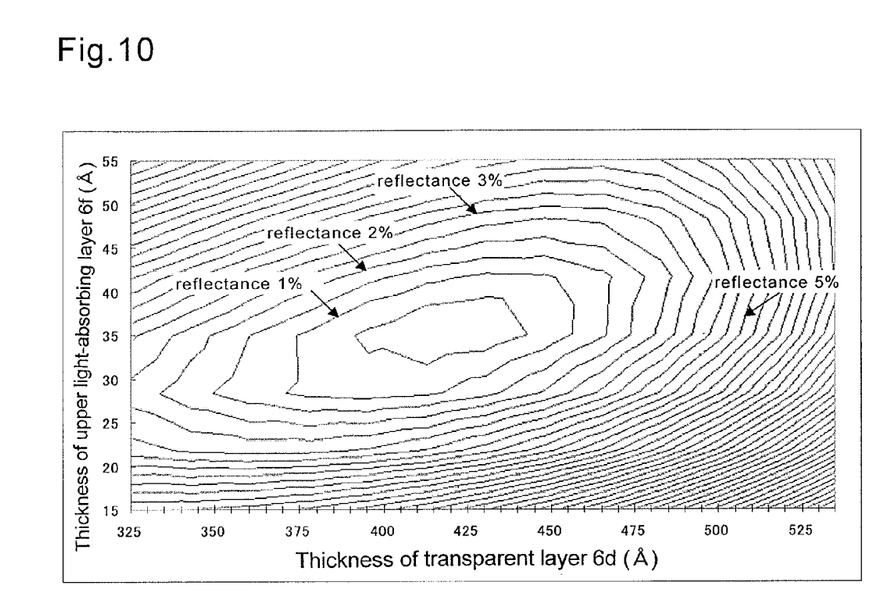
FIG. 10 is a graph illustrating the relationships between the reflectance and the thicknesses of a transparent layer and an upper light-absorbing layer of the thin film magnetic recording head illustrated in FIG. 2.

As described above, in the sample having the structure illustrated in FIG. 8, using the variation of the reflectance in the case where the medium is the atmosphere, the reflectance between the insulating layer 3c and the light-absorbing portion 6 can be evaluated, and the reflectance during the actual exposure can be calculated. FIG. 9 shows the result of obtaining the relationship between the extent of the variation of the reflectance in a case where the thickness of the insulating layer 3c of the above-described sample (medium: the atmosphere) illustrated in FIG. 8 is varied and the reflectance in the actual exposure process of a product (medium: photoresist) including the same light-absorbing portion 6. Based on FIG. 9, using the variation of the reflectance experimentally obtained using the sample (medium: the atmosphere) having the configuration illustrated in FIG. 8, the reflectance in the actual exposure process (medium: photoresist) is calculated, and then it becomes possible to find a condition such that the reflectance is 5% or less, preferably 3% or less, as described above. FIG. 10 is a reflectance distribution in the actual exposure process, which was obtained by such examination, with respect to the thicknesses of the transparent layer 6d and the upper light-absorbing layer 6f. The thicknesses of the adhesion layer (Cr layer) 6a, the adhesion layer (Ti layer) 6c, and the adhesion layer (Ti layer) 6e were respectively set at 10 Å, and the thickness of the adhesion layer (Ti layer) 6g was set at 30 Å.

As the result of the above-described examination, the preferable thicknesses of the layers of the light-absorbing portion 6 were obtained as follows. Herein, as described above, examined was the light-absorbing portion 6 (as a matter of convenience, referred to as a "first structure") that is formed with the adhesion layer (Cr layer) 6a, the lower light-absorbing layer (Ru layer) 6b, the adhesion layer (Ti layer) 6c, the transparent layer (SiO₂ layer or Al₂O₃ layer) 6d, the adhesion layer (Ti layer) 6e, the upper light-absorbing layer (Ru layer, NiFe layer, NiCr layer or the like, but not limited to these) 6f, the adhesion layer (Ti layer) 6g. Then, obtained were the thicknesses of the adhesion layer 6c, the transparent layer 6d, the adhesion layer 6e, the upper light-absorbing layer 6f, and the adhesion layer 6g, which are respectively suitable for a case in which KrF excimer laser (wavelength 248 nm) is irradiated as exposure light, a case in which ArF excimer layer (wavelength 193 nm) is irradiated, and a case in which i radiation (wavelength 365 nm) is irradiated.

In practice, the preferred film thicknesses of the upper light-absorbing layer 6f and the transparent layer 6e vary depending on the material of the upper light-absorbing layer 6f. Also, as illustrated in FIG. 10, film thicknesses of the upper light-absorbing layer 6f and the transparent layer 6e for obtaining a desired reflectance are determined related to each other. The following table shows that, in the configuration in which the upper light-absorbing layer 6f is formed of typical four materials (Ru, NiFe, NiCr, and Ti), the maximum value and the minimum value in a range where there is possibility that the reflectance is 5% or less (the range except for a case where there is no possibility that the reflectance is 5% or less.)

Exposure Light: KrF Excimer Laser (Wavelength 248 nm)

| Layer | Thickness (Å) |
| --- | --- |
| Adhesion Layer 6c | 0-300 (Preferably 10) |
| Transparent Layer (SiO₂ layer) 6d | 233-500 |
| Adhesion Layer 6e | 0-50 (Preferably 10) |
| Upper Light-Absorbing Layer 6f | 20-106 |
| Adhesion Layer 6g | 0-95 (Preferably 30) |

Exposure Light: ArF Excimer Laser (Wavelength 193 nm)

| Layer | Thickness (Å) |
| --- | --- |
| Adhesion Layer 6c | 0-300 (Preferably 10) |
| Transparent Layer (SiO₂ layer) 6d | 146-335 |
| Adhesion Layer 6e | 0-50 (Preferably 10) |
| Upper Light-Absorbing Layer 6f | 16-135 |
| Adhesion Layer 6g | 0-98 (Preferably 30) |

Exposure Light: i Radiation (Wavelength 365 nm)

| Layer | Thickness (Å) |
| --- | --- |
| Adhesion Layer 6c | 0-300 (Preferably 10) |
| Transparent Layer (SiO₂ layer) 6d | 565-834 |
| Adhesion Layer 6e | 0-50 (Preferably 10) |
| Upper Light-Absorbing Layer 6f | 14-103 |
| Adhesion Layer 6g | 0-100 (Preferably 30) |

Exposure Light: KrF Excimer Laser (Wavelength 248 nm)

| Layer | Thickness (Å) |
| --- | --- |
| Adhesion Layer 6c | 0-300 (Preferably 10) |
| Transparent Layer (Al₂O₃ layer) 6d | 227-369 |
| Adhesion Layer 6e | 0-50 (Preferably 10) |
| Upper Light-Absorbing Layer 6f | 18-99 |
| Adhesion Layer 6g | 0-90 (Preferably 30) |

Exposure Light: ArF Excimer Laser (Wavelength 193 nm)

| Layer | Thickness (Å) |
| --- | --- |
| Adhesion Layer 6c | 0-300 (Preferably 10) |
| Transparent Layer (Al₂O₃ layer) 6d | 127-252 |
| Adhesion Layer 6e | 0-50 (Preferably 10) |
| Upper Light-Absorbing Layer 6f | 11-95 |
| Adhesion Layer 6g | 0-98 (Preferably 30) |

Exposure Light: i Radiation (Wavelength 365 nm)

| Layer | Thickness (Å) |
| --- | --- |
| Adhesion Layer 6c | 0-300 (Preferably 10) |
| Transparent Layer (Al₂O₃ layer) 6d | 490-700 |
| Adhesion Layer 6e | 0-50 (Preferably 10) |
| Upper Light-Absorbing Layer 6f | 15-100 |
| Adhesion Layer 6g | 0-70 (Preferably 30) |

Also, examined was a light-absorbing portion 6 (as a matter of convenience, referred to as a "second structure") that is formed with the adhesion layer (Cr layer) 6a, the lower light-absorbing layer (Ru layer) 6b, the transparent layer (SiO₂ layer or Al₂O₃ layer) 6d, the upper light-absorbing layer (Ru layer, NiFe layer, NiCr layer or the like, but not limited to these) 6f while the adhesion layers 6c, 6e, and 6g are eliminated. Then, obtained were thicknesses of the transparent layer 6d and the upper light-absorbing layer 6f, which are respectively suitable for a case in which KrF excimer laser (wavelength 248 nm) is irradiated as exposure light, a case in which ArF excimer layer (wavelength 193 nm) is irradiated as exposure light, and a case in which i radiation (wavelength 365 nm) is irradiated as exposure light.

Exposure Light: KrF Excimer Laser (Wavelength 248 nm)

| Layer | Thickness (Å) |
| --- | --- |
| Transparent Layer (SiO₂ layer) 6d | 241-476 |
| Upper Light-Absorbing Layer 6f | 60-146 |

Exposure Light: ArF Excimer Laser (Wavelength 193 nm)

| Layer | Thickness (Å) |
|---|---|
| Transparent Layer (SiO₂ layer) 6d | 146-353 |
| Upper Light-Absorbing Layer 6f | 44-143 |

Exposure Light: i Radiation (Wavelength 365 nm)

| Layer | Thickness (Å) |
|---|---|
| Transparent Layer (SiO₂ layer) 6d | 565-870 |
| Upper Light-Absorbing Layer 6f | 31-140 |

Exposure Light: KrF Excimer Laser (Wavelength 248 nm)

| Layer | Thickness (Å) |
|---|---|
| Transparent Layer (Al₂O₃ layer) 6d | 233-377 |
| Upper Light-Absorbing Layer 6f | 32-140 |

Exposure Light: ArF Excimer Laser (Wavelength 193 nm)

| Layer | Thickness (Å) |
|---|---|
| Transparent Layer (Al₂O₃ layer) 6d | 131-252 |
| Upper Light-Absorbing Layer 6f | 53-132 |

Exposure Light: i Radiation (Wavelength 365 nm)

| Layer | Thickness (Å) |
|---|---|
| Transparent Layer (Al₂O₃ layer) 6d | 490-730 |
| Upper Light-Absorbing Layer 6f | 30-140 |

As a different example, with a light-absorbing portion 6 (as a matter of convenience, referred to as "third structure") that is formed with the adhesion layer (Cr layer) 6a, the lower light-absorbing layer (Ru layer) 6b, the adhesion layer (Ti layer) 6c, the transparent layer (SiO₂ layer or Al₂O₃ layer) 6d, the upper light-absorbing layer (TiO₂ layer) 6f, obtained were thicknesses of the transparent layer 6d and the upper light-absorbing layer 6f, which are respectively suitable for a case in which KrF excimer laser (wavelength 248 nm) is irradiated as exposure light.

Exposure Light: KrF Excimer Laser (Wavelength 248 nm)

| Layer | Thickness (Å) |
|---|---|
| Transparent Layer (SiO₂ layer) 6d | 83-347 (Preferably 210) |
| Upper Light-Absorbing Layer (TiO₂ Layer) 6f | 66-187 (Preferably 110) |

Exposure Light: KrF Excimer Laser (Wavelength 248 nm)

| Layer | Thickness (Å) |
|---|---|
| Transparent Layer (Al₂O₃ layer) 6d | 74-283 (Preferably 180) |
| Upper Light-Absorbing Layer (TiO₂ Layer) 6f | 63-184 (Preferably 110) |

Further, as another example, with a light-absorbing portion 6 (as a matter of convenience, referred to as a "fourth structure") that is formed with the adhesion layer (Cr layer) 6a, the lower light-absorbing layer (Ru layer) 6b, the adhesion layer (Ti layer) 6c, the upper light-absorbing layer (Ta₂O₅ layer) 6f, obtained were a thickness of the upper light-absorbing layer 6f, which is respectively suitable for a case in which KrF excimer laser (wavelength 248 nm) is irradiated as exposure light.

Exposure Light: KrF Excimer Laser (Wavelength 248 nm)

| Layer | Thickness (Å) |
|---|---|
| Upper Light-Absorbing Layer (Ta₂O₅ Layer) 6f | 105-160 (Preferably 130) |

It is preferred that the upper light-absorbing layer 6f is configured of a material of which extinction coefficient (optical constant) with respect to the exposure light (for example, KrF excimer laser, ArF excimer laser, or i radiation) is 0.1 or more, especially 1.0 or more because it is possible to make thinner. Specifically, the upper light-absorbing layer 6f is formed of a metal such as Ru, Ti, Cr, Ta, Ni, Fe, Cu, Au or the like, an alloy thereof, or translucent oxide such as TiO₂, Ta₂O₅, Cr₂O₃, Nb₂O₅ or the like. Especially, Ru, Ti, Cr, Ta, Ni, Fe, NiCr, NiFe alloy, NiCr alloy, or the like are preferred. Also, the upper light-absorbing layer 6f may take a configuration in which the upper light-absorbing layer 6f is sandwiched by the adhesion layers 6d and 6g as the above-described embodiment (for example, a configuration such as Ti/Ru/Ti and Ti/NiFe/Ti), and may also take a configuration in which the adjacent adhesion layers 6d and 6g are not provided (for example, a single layer of Ti layer).

The transparent layer 6d is configured of a material of which extinction coefficient with respect to the exposure light is 0.1 or less. Specifically, the transparent layer 6d is configured of SiO₂, Al₂O₃, MgO or the like.

The lower light-absorbing layer 6b is configured of the same material as one of the upper light-absorbing layer 6f. It is preferred that a thickness thereof in a case in which KrF excimer laser (wavelength 248 nm) is irradiated is 300 Å or more, a thickness thereof in a case in which ArF excimer layer (wavelength 193 nm) is irradiated is 400 Å or more, and a thickness thereof in a case in which i radiation (wavelength 365 nm) is irradiated is 200 Å or more.

Further, in a case where the adhesion layer 6a is provided under the lower light-absorbing layer 6b, it is preferred to be formed with a Cr layer, a Ti layer, a NiCr layer, a Ta layer or the like, of which a thickness is 5 Å-200 Å (preferably 5 Å-50 Å).

Also, on the upper light-absorbing layer 6f, a protective layer for protecting from process damages may be provided. The protective layer is configured of a transparent material such as SiO₂, Al₂O₃, or the like.

Preferred embodiments of the present invention have been shown and described in detail, but the descriptions thereof have been given as examples. It is to be understood that variety of changes and modifications may be made without departing from the spirit of scope of the following claims or its scope.

What is claimed is:

1. A thin film magnetic recording head having a multilayer structure in which plural thin films are laminated and being a perpendicular recording type that applies a magnetic field perpendicularly to a magnetic recording medium and performs recording, comprising:
    a main magnetic pole exposed on an air bearing surface facing the magnetic recording medium and guiding a magnetic flux toward the magnetic recording medium;
    a thin film positioned beneath the main magnetic pole from a perspective of a lamination direction and configuring a sensor or a heater configured to determine a distance from the magnetic recording medium of the thin film magnetic recording head; and
    a light-absorbing portion positioned between the main magnetic pole and the thin film, wherein
    the light-absorbing portion has a multilayer structure including at least a first light-absorbing layer, a second light-absorbing layer, and a transparent layer positioned between the first light-absorbing layer and the second light-absorbing layer.

2. The thin film magnetic recording head according to claim 1, wherein
    the first light-absorbing layer and the second light-absorbing layer are made of conductive materials,
    the transparent layer is made of an insulating material, and
    the thin film magnetic recording head further comprises a connection line connecting either one of or both the first light-absorbing layer and the second light-absorbing layer with a ground terminal.

* * * * *